March 19, 1957

T. F. THOMPSON 2,785,533

FLUID COUPLING

Filed June 22, 1955

INVENTOR
THEODORE F. THOMPSON

BY

ATTORNEY

INVENTOR
THEODORE F. THOMPSON
BY
ATTORNEY

March 19, 1957 T. F. THOMPSON 2,785,533
FLUID COUPLING
Filed June 22, 1955 3 Sheets-Sheet 3

INVENTOR
THEODORE F. THOMPSON

BY *[signature]*

ATTORNEY

United States Patent Office

2,785,533
Patented Mar. 19, 1957

2,785,533

FLUID COUPLING

Theodore F. Thompson, Des Moines, Iowa, assignor of fifty percent to H. W. Hartupee, Des Moines, Iowa Application June 22, 1955, Serial No. 517,138

6 Claims. (Cl. 60—54)

This invention relates to fluid drive mechanisms and consists more particularly in new and useful improvements in a fluid actuated clutch or fluid coupling adapted to be employed with any industrial or automotive equipment where it is desired to transmit power from a prime mover and input shaft to an output shaft.

The primary object of the invention is to provide an extremely simple fluid coupling, designed for incorporation within the fly-wheel driven by the input shaft, which fly-wheel acts both as the housing for the coupling components and as the reservoir for the operating fluid.

Another object of the invention is to provide a fluid coupling of this character, including a minimum of parts comprising essentially a pair of opposed impeller members, fixed within the combined fly-wheel-housing and driven by the input shaft, a rotor member interposed between said impeller members and keyed to the output shaft, and an automatic fluid directing means disposed within the reservoir formed by the combined fly-wheel-housing and adapted to direct the flow of fluid from the reservoir to the impeller members, in response to the centrifugal force set up by the rotating fly-wheel-housing.

A further object of the invention is to provide a fluid coupling, such as above referred to, wherein the opposed impeller members are designed to produce converging fluid forces which impinge on the peripheral vanes of the rotor member interposed therebetween.

Still another object of the invention is to provide a fluid coupling housed within the fly-wheel, the latter being internally divided into a fluid reservoir and a coupling chamber and including means within the reservoir, responsive to centrifugal force for directing the fluid from the reservoir into the coupling chamber, valve means being provided between the reservoir and the coupling chamber, under the control of centrifugal force, for progressively locking the driving fluid in the chamber as a predetermined speed of rotation is reached.

With the above and other objects in view, which will appear as the description proceeds, the invention consists in the novel features herein set forth, illustrated in the accompanying drawings and more particularly pointed out in the appended claims.

Referring to the drawings in which numerals of like character designate similar parts throughout the several views, Fig. 1 is a longitudinal sectional view through the fluid coupling mechanism, with the input and output shafts shown in full lines.

Figure 9:
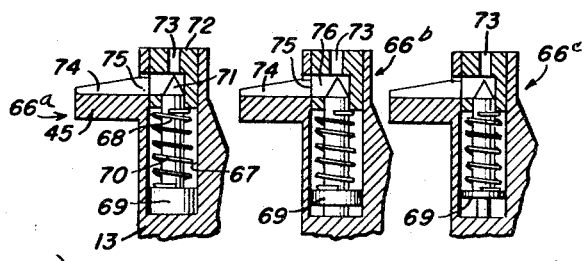
Figure 10:
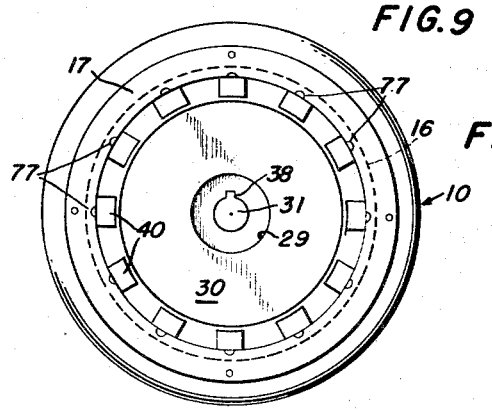

Fig. 9 collectively represents one each of the three types of valves employed for controlling the passage of fluid between the reservoir and the fluid coupling chamber, said valves being shown in cross section, and Fig. 10 is a reduced transverse sectional view through the coupling chamber.

Figure 1:
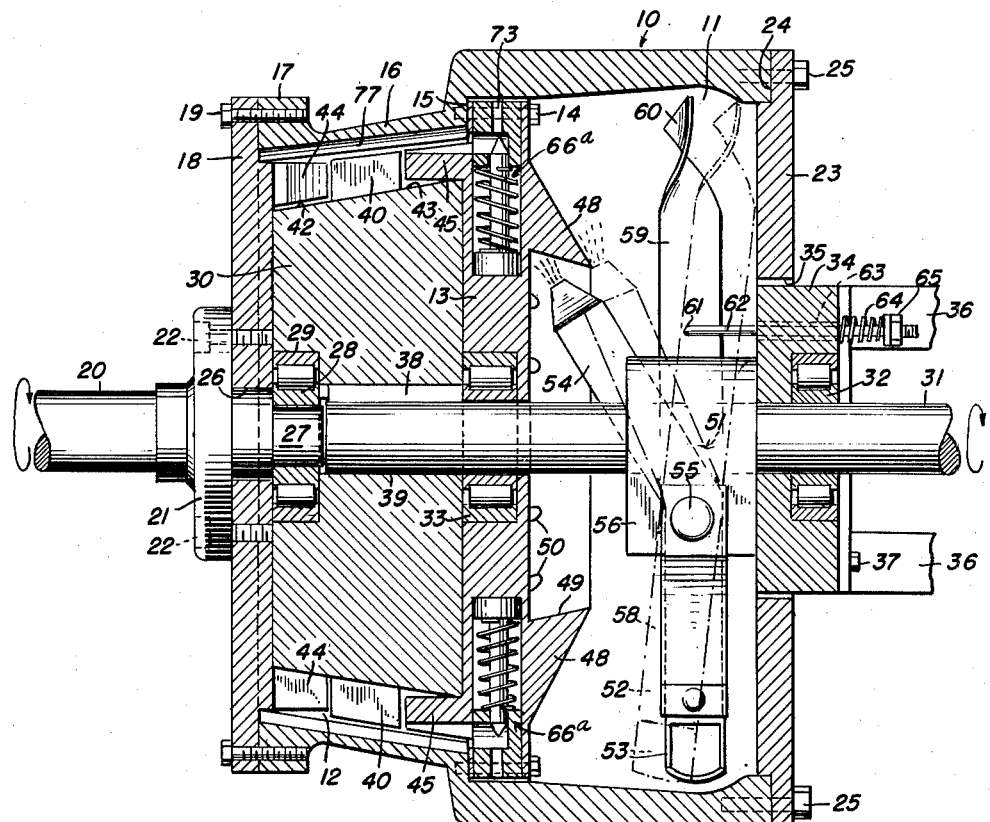

In the drawings, referring first to Fig. 1, 10 generally represents the main housing of the mechanism, which in actual use replaces the normal fly-wheel which is driven by the prime mover. The housing 10 is internally divided into a driving fluid reservoir 11, which occupies substantially the rear half of the housing, and a forwardly disposed fluid coupling chamber 12, which houses the fluid coupling elements to be described. An annular partition 13 serves to separate the reservoir 11 from the fluid coupling chamber 12 and is preferably maintained in place by a series of bolts or the like 14, which threadedly engage a suitable shoulder 15 against which the peripheral edge of the partition 13 abuts.

The fluid coupling chamber 12 is preferably, although not necessarily, of substantially frusto-conical shape, its walls 16 converging forwardly and terminating in a radial flange 17, by means of which the forward closure 18 is bolted in place by bolts or the like 19. The closure plate 18 is fixed to the input shaft 20 which leads from the prime mover (not shown), any suitable connecting means such as the flanged collar 21 being employed for this purpose. Bolts or screws 22 extend through the flange 21 and into the face of the closure plate 18 so that upon rotation of the input shaft 20 the closure plate 18 and the housing 10 rotate with the input shaft as a unit. A rear closure plate 23, preferably recessed as at 24, to receive the annular rim of the reservoir wall, is bolted to the latter by bolts 25, to thereby close the rear end of the housing and reservoir.

The rear end of the input shaft 20 projects through an opening 26 in the front closure plate 18 and is preferably reduced as at 27 to receive a suitable bearing race 28, carried in a recess 29 in a rotor member 30, hereinafter referred to in detail. An output shaft 31, concentric with but independent of the input shaft 20, projects into the housing 10 from the rear end thereof and extends through suitable openings in the rear closure plate 23 and the intermediate partition 13, which are respectively provided with conventional bearings 32 and 33. The bearing 32 is mounted in a suitable supporting head 34, which fits within an opening 35 of the rear closure plate 23 and is fixed to a bracket member 36 by bolts or the like 37, the bracket 36 being supported by any suitable means (not shown). The forward end of the output shaft 31 is keyed as at 38 to the rotor member 30 within which it is inserted through a coaxial opening 39.

Figure 5:
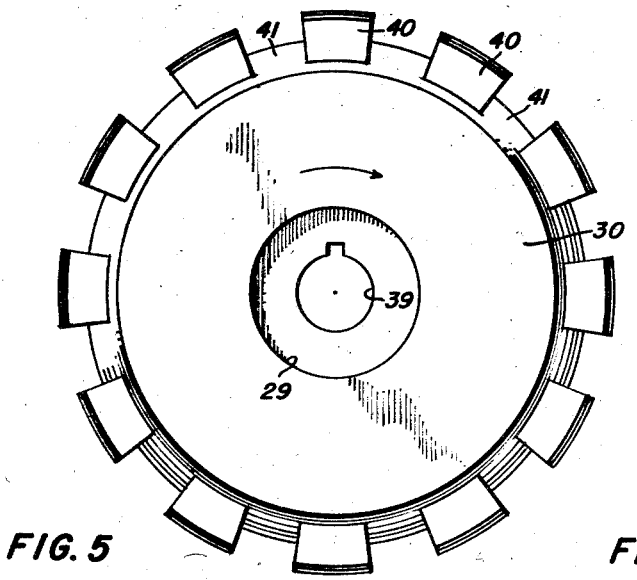
Fig. 5 is a plan view of the rotor member.
Figure 6:
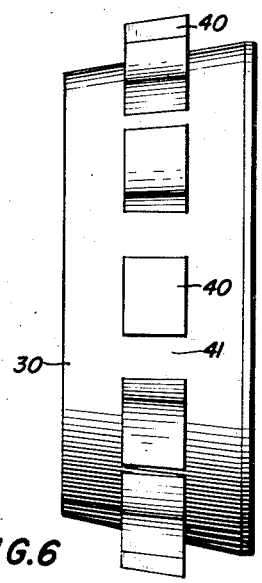
Fig. 6 is a side elevational view of the rotor member.

Turning now to Figs. 5 and 6, it will be seen that the rotor member 30 is substantially frusto-conical in shape to coincide with the contour of the inner walls 16 of the fluid coupling chamber 12 and its periphery is provided centrally with a series of radially extending tooth-like vanes 40, equally spaced as at 41. The rotor 30 fits closely within the chamber 12 with a rotating clearance between its end faces and the adjacent faces of the front closure plate 18 and the intermediate partition 13, respectively. The radial extremities of the vanes 40 on the rotor 30 are inclined to conform to the converging walls 16 of the fluid coupling chamber 12 and a rotating clearance is provided between said vanes and walls. Thus, when the rotor 30 is installed within the chamber 12, the centrally disposed radial vanes 40, in effect, provide two annular fluid receiving areas 42 and 43 which bound opposite ends of the rotor, on either side of the vanes, said areas being interconnected transversely by the spaces 41 which separate the series of teeth or vanes 40.

The impeller mechanism which acts in conjunction with the rotor 30 to provide the fluid coupling, consists of two sets of oppositely disposed impeller blades 44 and 45, formed integrally with the opposed faces of the forward cover plate 18 and the intermediate partition 13, respectively. These blades 44 and 45 project inwardly toward one another in planes parallel with the axis of the shafts 20 and 31 and are arranged to overlie the periphery of the rotor 30, being rotatable within the annular areas 42 and 43, respectively, upon the relative rotation of the main housing 10 and the rotor 30, as will be seen from Figure 1.

Figure 3:
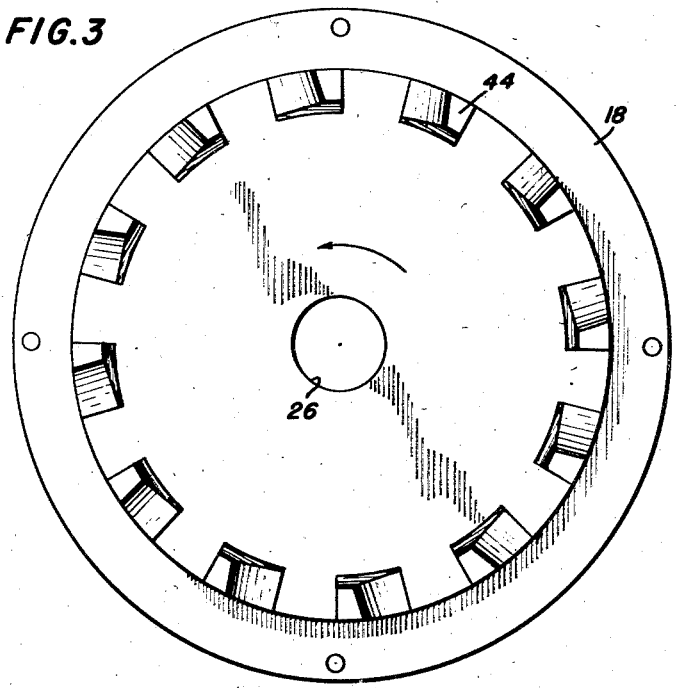
Fig. 3 is a plan view of the forward impeller member and housing closure.
Figure 4:
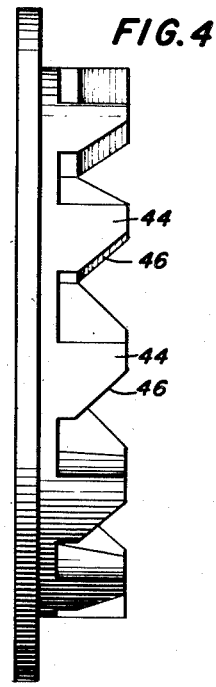
Fig. 4 is a view of the same in side elevation.

As shown in Figs. 3 and 4, the forward blades 44 are annularly spaced around the inner face of the front closure 18 and their leading edges are inclined as at 46, to provide a fluid impelling pitch which directs any fluid within the area 42, toward the vanes 40 on the periphery of the rotor 30. Similarly, the blades 45 are annularly spaced around the inner face of the intermediate partition 13 and being on the opposite side of the vanes 40, the leading edges of the teeth 45 are oppositely inclined as at 47 to provide fluid impelling faces for directing fluid from the annular area 43 toward the vanes 40 during rotation of the housing 10.

By the peripheral arrangement and relationship of the coacting vanes 40 and blades 42 and 45, the reaction between the impeller and rotor takes place in a plane parallel with respect to the axis of the shafts 20 and 31. Thus, the reaction is constant as distinguished from the variable reaction resulting from devices wherein the blades or vanes of the impeller and rotor pass each other in a plane which is perpendicular to the axis of this shaft.

Figure 2:
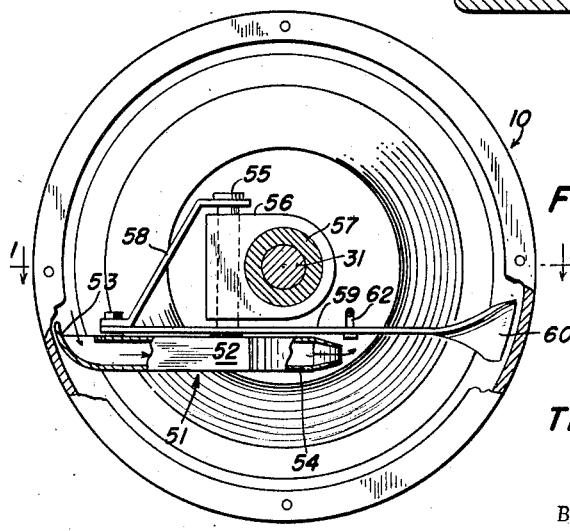
Fig. 2 is a reduced transverse sectional view through the reservoir, taken at right angles to Fig. 1, and showing the automatic fluid directing means.
Figure 7:
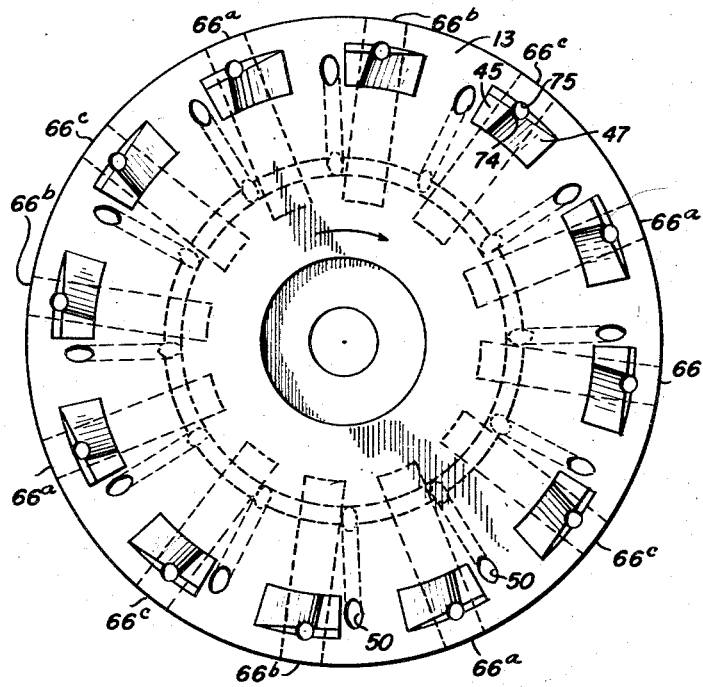
Fig. 7 is a plan view of the rear impeller member and fluid coupling chamber partition.
Figure 8:
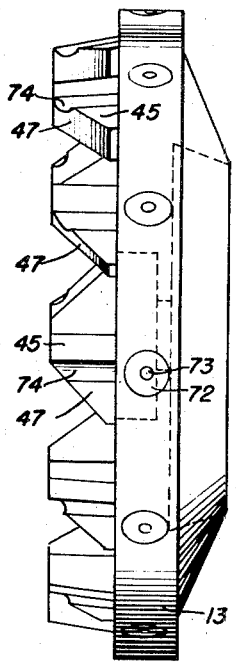
Fig. 8 is a view of the same in side elevation.

The fluid directing and control structure will best be seen from Figures 1, 7 and 8 and, referring first to Fig. 1, it will be noted that the rear face of the intermediate partition 13 is provided with a raised boss 48 which projects concentrically within the reservoir 11, its outer face being preferably beveled as shown to facilitate the flow of fluid. The central portion of the boss 48 is recessed as at 49 to provide a fluid distributing well having annular walls which diverge toward the inner extremity of the well. A series of annularly disposed diverging passageways 50 communicate with said well at one end and extend through the partition 13, terminating at their opposite ends in communication with the fluid coupling chamber 12, said passageways being spaced around the partition 13 and opening into the chamber 12 at spaced intervals between the blades 45, as seen in Fig. 7. The fluid from the reservoir 11 is introduced into the fluid distributing well 49 by a fluid directing jet assembly, generally indicated by the numeral 51, which consists of a tubular intake arm 52, having a scoop-like mouth 53, which is normally directed forwardly with respect to the plane of rotation of the housing 10. Formed integrally with the intake arm 52 and directed at an angle toward the well 49, is a tubular discharge arm or jet 54, the combined arms 52 and 54 being pivotally mounted as at 55 on a pivot pin which extends through at a collar member 56, which, as best seen in Fig. 2, embraces a bearing 57 surrounding the output shaft 31. A bracket arm 58 extending between the pivot pin 55 and the intake arm 52, completes the pivotal support. The collar 56 is rigidly secured by any suitable means to the shaft supporting head 34, so that as the housing 10 rotates, the collar 56 remains stationary and supports the fluid directing assembly 51 in fixed relation.

Attached to the assembly 51 and projecting diametrically opposite from the intake arm 52, is a rudder arm 59 terminating at its free end in a rudder member 60 formed with a pitch adapted to control the pivotal movement of the assembly 51 through its contact with the fluid in the reservoir 11, as will be later described. The rudder arm 59 is attached as at 61 to one end of a spring pressed rod 62, the latter extending rearwardly through an opening 63 in the head 34 with its free end carrying a coil spring or the like 64, interposed between the rear face of the head 34 and an adjusting nut assembly 65 engaging complementary threads on the free end of the rod 62. The rod 62 is slidably disposed in the opening 63 and under the tension of spring 64, is normally drawn toward the right, looking at Figure 1, exerting a clockwise tension on the rudder arm 59 and the assembly 51.

Thus, the entire fluid directing assembly 51, including the intake arm 52, the discharge or jet arm 54, and the rudder arm 59, is rotatable as a unit about the pivot pin 55. In its inactive position and until such time as sufficient velocity is developed in the fluid in reservoir 11 by rotation of the housing 10, the assembly 51 remains in the dotted line position shown in Fig. 1, with the rudder arm 59 drawn toward the right of the reservoir and the jet arm 54 maintained out of line with the fluid distributing well 49. As the velocity of the fluid in reservoir 11 increases, its contact with the rudder 60 forces the rudder arm 59 in counterclockwise direction and progressively directs the jet arm 54 into the fluid distributing well 49, as shown in full lines, so that the fluid gathered by the intake scoop 53 is discharged into the well 49 from whence it passes through the diverging ports or passageways 50, into the fluid coupling chamber.

As previously stated, the input shaft 20 is positively driven by a suitable prime mover and, due to its connection to the forward closure plate 18, the entire housing 10 is caused to rotate (for example, in clockwise direction) under the direct force of the prime mover. As the housing 10 rotates, it carries with it the two sets of annularly spaced impeller blades 44 and 45, which rotate independently of the rotor member 30 and its peripheral vanes 40. As the fluid from reservoir 11 enters the annular fluid coupling area surrounding the periphery of the rotor member 30, upon the development of sufficient centrifugal force, the rotating impeller blades 44 and 45 cause such fluid to impinge upon the vanes 40 interposed between the impeller blades, thereby imparting a corresponding rotation to the rotor member 30. As the output shaft 31 is keyed to the rotor member 30, said output shaft is caused to rotate with the rotor. An increase in speed of the input shaft 20 and the housing 10 results in a corresponding increase in the speed of rotation of the output shaft 31.

After a predetermined operating speed has been developed in the fluid coupling mechanism, it is desirable for the optimum performance of the device, to lock the driving fluid within the peripheral area surrounding the rotor member 30 so that its full effect may be employed in transmitting the driving force of the input shaft 20 to the output shaft 31, through the rotor 30. This fluid lock is accomplished by providing a series of needle valve members 66 arranged radially within the intermediate partition 13, preferably with one valve member adjacent each of the impeller blades 45, which are carried by the partition 13. As best seen in Fig. 9, these valve members, although of similar construction, are preferably formed in three sets, respectively constructed for operation under varying conditions of centrifugal force. Each of these valve members is inserted in a radially disposed well 67 in the partition 13 and consists of a needle valve element 68 having a reciprocable piston or base member 69, normally maintained in seated position on the floor of the well 67 by a coil spring 70. The operating end of the valve is pointed as at 71 and slidably engages a plug member 72 which closes the outer extremity of the well 67 and may be screwed, sweated or otherwise secured in place. The spring 70 is interposed between the inner end of the plug 72 and the piston or base 69. Each of the plugs 72 is provided with a central orifice 73, in which the operating end 71 of the valve is adapted to seat upon the outward movement of the valve stem 68, which, as will later appear, is accomplished by centrifugal action through the weighted piston 69.

The outer face of each tooth 45 is provided with a groove or trough 74, which communicates at its inner end with a port 75 leading to the valve chamber 76 which houses the operating end of the valve 68 and, in turn, communicates with the orifice 73, in the plug 72. The opposite end of each trough 74 is aligned and communicates with a groove 77 (Fig. 1) in the inner periphery of the wall 16 of the fluid coupling chamber 12, so as to provide free fluid communication between the area surrounding the rotor 30 and the series of radial valves 66.

The inner peripheral edge of the intermediate partition 13 from the series of orifices 73, is provided with a sufficient clearance 78 to permit the return flow of fluid from the coupling chamber 12 to the reservoir 11, when the valves 66 are in open position. However, when the valves are closed, as will now be described, their operating ends 71 seat in the respective orifices 73 and lock the driving fluid within the fluid coupling chamber 12.

As shown in Fig. 9, one set of valves 66a are provided with a relatively large or heavily weighted piston 69, while another set of valves 66b and a third set 66c are respectively provided with progressively smaller or lighter weighted pistons 69. There are preferably twelve of these valves and they are alternately arranged as shown in Fig. 7, in sets of four with valves of corresponding weights disposed diametrically opposite each other.

With this valve structure and arrangement, the needle valves respond progressively to the centrifugal force developed by the rotation of the housing 10, with the heavier valves 66a closing first under the weight of their heavier pistons 69 and the lighter valves following with the increase in centrifugal force developed. After a predetermined speed has been reached, all three sets of valves are closed to lock the fluid in the coupling chamber 12.

In operation, the reservoir 11 is charged with any suitable driving fluid, a relatively small quantity of such fluid being required due to the fluid directing and distributing means which come into play upon rotation of the housing 10. The input shaft is caused to rotate by any conventional motive power or prime mover, simultaneously rotating the combined flywheel and housing 10. At the outset and during the low speed or idling speed of the prime mover, insufficient reaction force is developed to have any effect on the fluid directing assembly 51 and this assembly remains inactive, in the position shown in dotted lines in Fig. 1. However, upon an increase in the speed of rotation of the input shaft 20 with the resultant increase in velocity of the fluid within the reservoir 11, the driving fluid is thrown outwardly against the inner periphery of the reservoir 11. As the housing rotates, the rotating fluid contacts the rudder 60 and gradually directs the assembly 51 in counterclockwise direction, so that the fluid scooped up by the inlet end 53 of the intake tube 52 is forced through the discharge or jet tube 54, which directs a constant stream of fluid into the well 49 from which it is distributed through diverging ports 50 by the action of centrifugal force, into the area surrounding the rotor 30. Here, the rotation of the opposed impeller blades 44 and 45 due to their inclined leading edges, causes two opposed fluid forces to impinge upon the intervening vanes 40 of the rotor 30. The rotor 30 is thereby forced to rotate and with it, the output shaft 31, which leads to the point of power utilization.

During the course of this operation and with the gradual increase in the centrifugal force developed in the unit, the valve members 66 progressively come into play and lock the fluid in the fluid coupling chamber 12 by the successive closure of the needle valves 68, which condition is maintained until there is a reduction in the speed of rotation of the housing 10. Thereupon, the reverse operation of the needle valves 68 takes place and they progressively release the fluid from the coupling chamber 12 back into the reservoir 11, through the orifices 73 and clearance 78.

It will be apparent that a fluid coupling constructed in accordance with this invention is adaptable to many uses and due to its extreme simplicity and minimum number of parts, it can be manufactured at a relatively low cost. Its fluid controlling features and the progressive locking of the driving fluid within the fluid coupling chamber, provide an extremely effective means for transferring motive power from the input to the output shaft with the complete elimination of any mechanical connections. One of the distinct advantages of this mechanism lies in the progressive effectiveness of the coupling and the avoidance of sudden shocks in starting.

From the foregoing it is believed that the invention will be readily understood by those skilled in the art without further description, it being borne in mind that numerous changes may be made in the details disclosed, without departing from the spirit of the invention as set forth in the following claims. For example, instead of having only one rotor as shown in the drawings, the assembly may embody two or more rotors generally similar to that described above. Under some circumstances this may be desirable to improve the efficiency of the coupling.

I claim:

1. A fluid coupling interposed between a power driven input shaft and a coaxial output shaft, comprising an annular housing fixed coaxially on one end of said input shaft for rotation therewith, and rotatably embracing the adjacent end of said output shaft, a fixed partition dividing said housing into a driving fluid reservoir and a fluid coupling chamber, fluid in said reservoir, a rotor in said chamber, keyed to said output shaft and rotatable independently of said housing, an impeller in said chamber, rotatable with said housing, and adapted to direct a fluid force against said rotor, a fluid receiving well in said partition coaxial with said reservoir and open to the latter, a series of fluid passageways leading from said well to said coupling chamber, and a fluid directing assembly mounted in said reservoir and operable by the reaction force of the fluid therein, developed upon the rotation of said housing, for directing the fluid from said reservoir into said well.

2. A fluid coupling as claimed in claim 1, wherein said fluid directing assembly comprises a fluid directing tube pivotally mounted intermediate its ends at a fixed point in said reservoir, an inlet at one end of said tube submerged in the fluid in said reservoir and directed forwardly in the plane of rotation of said reservoir, the opposite end of said tube forming a discharge jet arranged for pivotal movement into and out of said well, and a rudder member operatively connected to said tube and actuated by the reaction force of the fluid in said reservoir for controlling the pivotal movement of said tube, whereby as the reaction force of the fluid in said reservoir increases, said discharge jet is directed into said well.

3. A fluid coupling as claimed in claim 2, including spring means normally urging said fluid directing assembly out of said well.

4. A fluid coupling interposed between a power driven input shaft and a coaxial output shaft, comprising an annular housing fixed coaxially on one end of said input shaft for rotation therewith, and rotatably embracing the adjacent end of said output shaft, a fixed partition dividing said housing into a driving fluid reservoir and a fluid coupling chamber, fluid in said reservoir, a rotor substantially filling said chamber and spaced radially from the peripheral wall of the latter to define therewith an annular peripheral working space of small radial dimensions with respect to said chamber, a series of annularly spaced, peripheral vanes, on said rotor projecting radially into said space, a complementary annular series of impeller blades within said working space, fixed to and rotatable with the wall of said chamber, the radial dimensions of said vanes and blades being substantially equal to the corresponding dimensions of said working space, an annular series of fluid conducting passageways leading from said reservoir to said working space, means controlled by the reaction force of the fluid in said reservoir, upon rotation of said housing, for directing said fluid to said passageways, a series of fluid return vents leading from said working space to said reservoir, normally open valves, operable by centrifugal force for closing respective vents, and valve control means respectively operable under progressively increasing degrees of centrifugal force, for sequentially actuating the valves of said series.

5. A fluid coupling interposed between a power driven input shaft and a coaxial output shaft, comprising an annular housing fixed coaxially on one end of said input shaft for rotation therewith, and rotatably embracing the adjacent end of said output shaft, a fixed partition dividing said housing into a driving fluid reservoir and a fluid coupling chamber, fluid in said reservoir, a rotor in said chamber, keyed to said output shaft and rotatable independently of said housing, an impeller in said chamber, rotatable with said housing, and adapted to direct a fluid force against said rotor, a series of fluid conducting passageways leading from said reservoir to said chamber, means controlled by the reaction force of the fluid in said reservoir, upon rotation of said housing, for directing said fluid to said passageways, a series of fluid return vents leading from said chamber to said reservoir, normally open valves, operable by centrifugal force for closing respective vents, and valve control means respectively operable under progressively increasing degrees of centrifugal force, for sequentially actuating the valves of said series.

6. A fluid coupling as claimed in claim 5, wherein said valves are radially disposed in said partition and alternately provided with valve stems of varying weights, whereby the valves of said series are progressively closed as the centrifugal force developed by the rotation of said housing, increases.

References Cited in the file of this patent
UNITED STATES PATENTS

| | | |
|---|---|---|
| 1,746,148 | Eaton | Feb. 4, 1930 |
| 1,862,045 | Beaumont et al. | June 2, 1932 |
| 2,536,473 | Sinclair | Jan. 2, 1951 |
| 2,569,087 | Alexandrescu | Sept. 25, 1951 |
| 2,570,768 | Clerk | Oct. 29, 1951 |